United States Patent Office 3,504,972
Patented Apr. 7, 1970

3,504,972
EXPOSURE ADJUSTING APPARATUS FOR A DUPLICATOR
Shigeru Suzuki, Yokohama-shi, and Yutaka Koizumi, Tokyo, Japan, assignors to Kabushiki Kaisha Ricoh, Tokyo, Japan
Filed Sept. 28, 1967, Ser. No. 671,282
Claims priority, application Japan, Oct. 4, 1966, 41/65,272
Int. Cl. G03b 27/50
U.S. Cl. 355—51    4 Claims

ABSTRACT OF THE DISCLOSURE

A duplicator and in particular an apparatus to adjust the exposure of a duplicator having a movable exposure apparatus which performs slit exposure on printing paper by moving between a stationary original and the printing paper. The movable exposure apparatus comprises a pivotal slit width adjusting plate which is connected by a string to an oscillatible member carrying a pin which is engaged in a displaceable engaging member when the exposure apparatus is in an initial position, the engaging member being preset from outside the duplicator to a position in which the oscillatible member causes the adjusting plate to occupy a position corresponding to a particular slot width.

---

Figure 1:
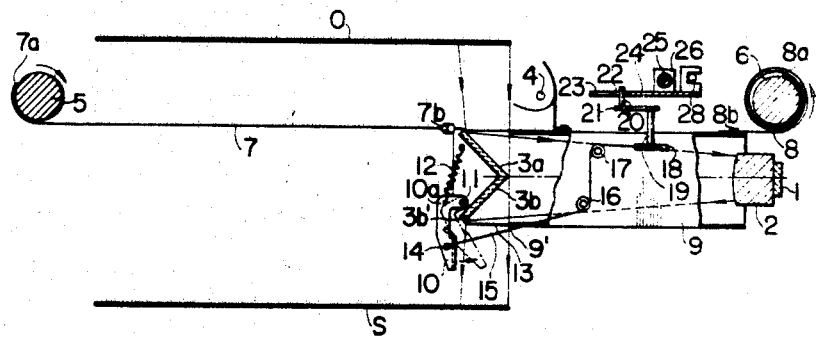

This invention relates to a duplicator, more specifically, an apparatus to adjust the exposure amount of the duplicator having a movable exposure apparatus which performs slit exposure on printing paper by moving between a stationary original and said printing paper.

The object of this invention is to provide an apparatus which can operate simply and certainly the slit width adjusting plate provided on said movable exposure apparatus moving inside the duplicator body, by means of an adjusting element provided outside the duplicator.

This is achieved according to the invention by the provision of rotatable means supported from the movable exposure apparatus and engageable with the adjusting plate to adjust the slit width when the exposure apparatus is in an initial position and the rotatable means engages the adjusting element.

This invention is now described in greater detail with reference to the drawing showing an embodiment of the invention.

Figure 2:
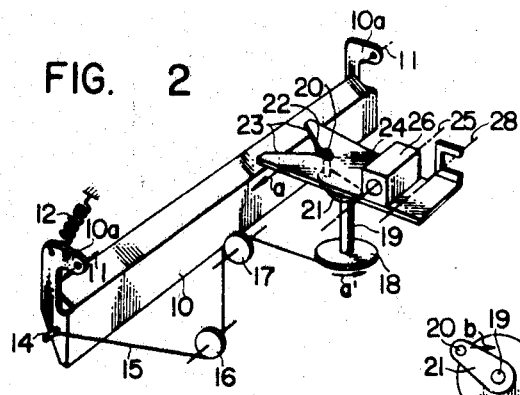
Figure 3:
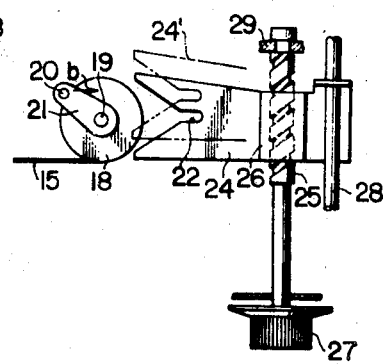

In the drawing:

FIG. 1 is a diagrammatic sectional view illustrating an embodiment of the slit exposure apparatus, FIG. 2 is a perspective view showing only the major parts of the apparatus of this invention; and FIGURE 3 denotes a fragmentary plan view of FIG. 2.

The movable exposure apparatus comprises a duplicator lens 2 having a reflecting mirror 1 at the back, a rectangular reflecting mirror 3a which is inclined at 45° to an imaginary horizontal plane including the optical axis of said lens 2 and which has a reflecting surface turned to the original O, a reflecting mirror 3b having a reflecting surface turned to the printing paper S, an illumination tube 4 illuminating said original O, shades 7 and 8 the outer ends 7a and 8a of which are respectively fixed to a pair of winding shafts 5 and 6 rotating in the direction as shown by the arrows and the inner ends 7b and 8b of which are respectively fixed to both the ends of the movable exposure apparatus. Each of the elements mentioned above is mounted on an optical supporting frame 9. The supporting frame 9 is supported by the duplicator body through suitable guide rails so as to move back and forth between the stationary original O and the printing paper S. While the supporting frame 9 is moving leftwards from the position shown in the drawing, the slit exposure is performed on the printing paper S. Then the supporting frame 9 moves back to its initial position again.

Near said reflecting mirror 3b, a slit width adjusting plate 10 is provided which can oscillate under the reflecting mirror 3b by pivoting its arm 10a at the supporting frame 9 through a shaft 11. The plate 10 is biased to rotate clockwise around the shaft 11 by a weak spring 12, that is, to rotate in the same direction with the opening direction of the slit 13 between the lower end 3b' of the reflecting mirror 3b and an end 9' of the supporting frame 9. One end of a connecting string 15 is fixed to a pin 14 provided on the slit adjusting plate 10, and the other end is fixed to the circumferential surface of a rotating disc 18 through guide rollers 16 and 17 pivoted on the side surface of the supporting frame 9. Said rotating disc 18 is fixed at the lower end of a vertical shaft 19 which is suitably supported by the supporting frame 9. An oscillating member 21 with a pin 20 fixed thereto is tightly mounted at the upper end of said vertical shaft 19. Even though said vertical shaft 19 is given a turning force by the elasticity of the spring 12 provided on the slit width adjusting plate 10, a frictional force strong enough to prevent the rotation by the elasticity of the spring 12 is applied to said vertical shaft 19.

On an engaging member 24 having a notch 22 into which said pin 20 is inserted when the movable exposure apparatus is at its initial position and a V-shaped guide edge 23 connected with said notch 22, is tightly mounted a block 26 into which a screw lever 25 supported by the duplicator body is inserted, at right angles to the moving direction of said movable exposure apparatus. Said engaging member 24 is moved parallel with the axial direction of the screw lever 25 by rotating an adjusting knob 27 provided at the outer end of said screw lever 25. Rotation of said engaging member 24 by the screw lever 25 is prevented by a guide rod 28 inserted into a part of said engaging member 24. The movement of said screw lever 25 in the axial direction is also prevented by a bearing 29 (see FIG. 3).

In FIG. 2, when the engaging member 24 is moved in the direction shown by arrow a, the rotating disc 18 rotates in the direction shown by arrow a' and pulls the connecting string 15 and the slit width adjusting plate 10 oscillates about the shaft 11 against the elasticity of the spring 12 in the direction to reduce the width of the slit 13 (see FIG. 1).

The pin 20 positioned by the engaging member 24 maintains its initial position even when the movable exposure apparatus moves away from the engaging member 24. When said movable exposure apparatus returns to its initial position, the pin 20 is inserted again into the notch 22. In this way the exposure amount, that is, the slit width can be adjusted by means of the adjusting knob mounted at a stationary position outside the duplicator, to provide cooperation between the oscillating member provided on said movable exposure apparatus and the engaging member provided on the duplicator body side when the movable exposure apparatus is at its initial position.

The V-shaped guide edge 23 connected with the notch 22 for positioning said engaging member 24 is used to guide the pin 20 into the notch 22 despite the oscillating position of said pin and the variable adjusting position of said engaging member 24. Namely, when the adjusting knob is rotated while the pin 20 is moving away from the notch 22 with the movable exposure apparatus, for instance, as shown in FIG. 3, when the engaging member 24 positioned at a position 24' shown by a dotted line before the pin 20 starts to move away is moved to the position shown by full lines while the pin 20 is moving away, the pin 20 is, in the return stroke shown by an arrow b, guided into the notch 22 by the guide edge 23.

As the movable exposure apparatus is moving inside the duplicator body, it is necessary to provide in the duplicator housing a slot long enough to cover the length of the movement of said movable exposure apparatus in order that the operating member which operates the slit width adjusting plate provided on said movable exposure apparatus is exposed out of the duplicator. In this invention, on the other hand, the above-mentioned means is not necessary. That is, when the movable exposure apparatus is in its initial position, the slit width of said movable exposure apparatus can be adjusted very easily by the adjusting knob provided at a stationary position outside the duplicator, by providing on the duplicator body side the engaging member which cooperates with the oscillating member on said movable exposure apparatus. Moreover, when the movable exposure apparatus moves back to its initial position, as the V-shaped guide edge is provided on said engaging member 24 in order to guide said oscillating member 21 to the stationary position of the engaging member 24 despite the oscillating position of the oscillating member and the variable adjusting position of the engaging member 24, no trouble will be encountered between the exposure adjusting mechanism on the movable exposure apparatus and the adjusting mechanism on the duplicator body side even if the adjusting knob is rotated by mistake while the movable exposure apparatus is moving, or even if said adjusting knob is operated as the next step of the exposure amount adjustment for the exposure.

While the present invention has been particularly described in terms of specific embodiments thereof it will be understood that in view of the present disclosure numerous deviations therefrom and modifications thereupon may be readily devised by those skilled in the art.

We claim:

1. In a duplicator having a movable exposure apparatus which performs slit exposure on printing paper by moving between a stationary original and the printing paper, an improvement comprising a slit width adjusting plate having a side edge which limits the slit width of said exposure apparatus, a rotatable means engageable with said adjusting plate to vary the position of said side edge and thereby the slit width, said adjusting plate and rotatable means being mounted on said movable exposure apparatus, and a displaceable engaging member supported at a fixed location adjacent the path of travel of the exposure apparatus and operable from outside the duplicator to engage said rotatable means and rotate the same to a position in which the slit width is preset when said movable exposure apparatus is at an initial position, said adjusting plate remaining in said preset position as the exposure apparatus moves between the original and printing paper and performs slit exposure and thereafter returns to said initial position.

2. An improvement as claimed in claim 1 wherein said adjusting plate is pivotably supported on said exposure apparatus and said engaging member is displaceable by being rectilinearly moved.

3. An improvement as claimed in claim 1 wherein said engaging member has a V-shaped guide edge opening towards said rotatable means to receive and guide said rotatable means as the exposure apparatus returns to said initial position.

4. An improvement as claimed in claim 3 wherein said rotatable means comprises an oscillatible member with a pin fixed thereto engageable with said engaging member after passing said V-shaped guide edge, and means coupling said adjusting plate with said ocillatible member to follow the movement thereof.

References Cited

UNITED STATES PATENTS 2,153,186  4/1939  Henderson _____ 355—71 X
3,364,816  1/1968  Jeffree _____ 355—51

NORTON ANSHER, Primary Examiner

R. A. WINTERCORN, Assistant Examiner

U.S. Cl. X.R.
355—71, 74, 84